(No Model.)

C. E. HADLEY.
CYCLE.

No. 495,732.  Patented Apr. 18, 1893.

Witnesses:
J. H. Shumway
Lillian D. Kelley

Charles E. Hadley
Inventor
By attys
Earle Seymour

UNITED STATES PATENT OFFICE.

CHARLES E. HADLEY, OF CHICOPEE, MASSACHUSETTS, ASSIGNOR TO THE OVERMAN WHEEL COMPANY, OF HARTFORD, CONNECTICUT, AND CHICOPEE FALLS, MASSACHUSETTS.

CYCLE.

SPECIFICATION forming part of Letters Patent No. 495,732, dated April 18, 1893.

Application filed November 21, 1892. Serial No. 452,675. (No model.)

*To all whom it may concern:*

Be it known that I, CHARLES E. HADLEY, of Chicopee, in the county of Hampden and State of Massachusetts, have invented a new Improvement in Cycles; and I do hereby declare the following, when taken in connection with accompanying drawings and the letters of reference marked thereon, to be a full, clear, and exact description of the same, and which said drawings constitute part of this specification, and represent, in—

Figure 1:
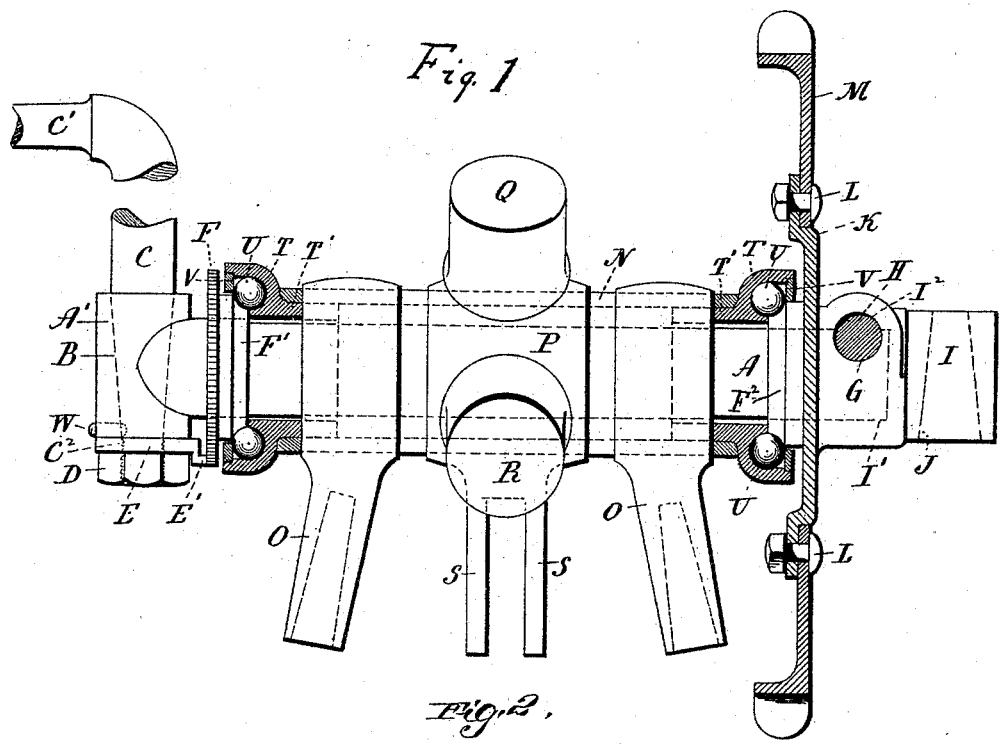
Figure 2:
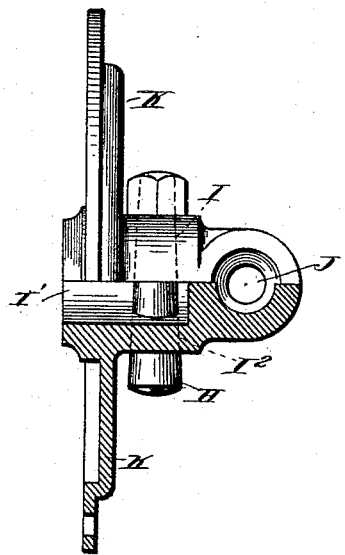

Figure 1 a plan view, partly in section, of a crank-shaft and associated parts constructed in accordance with my invention; Fig. 2 a detached half section view of the hub I of the shaft.

My invention relates to an improvement in cycles, and more particularly to the crank-shaft and associated parts thereof, the object being to produce simple, convenient, durable, and light construction, adapted to be easily organized and dismembered as may be required.

With these ends in view, my invention consists in certain details of construction and combinations of parts as will be hereinafter described, and pointed out in the claims.

In carrying out my invention, I construct the axle A, at one end with an integral transverse enlargement A', which is formed with a tapered hole or socket B, extending longitudinally through it, and centrally intersecting the axial center of the shaft. The said socket B, receives the tapered inner end of the crank C, which, by preference, is formed from a round rod of steel, having its outer end bent at a right angle, and shaped to form the pedal-spindle C', the said spindle and crank being therefore made integral. The extreme inner end of the crank is threaded, as at $C^2$, and projects through the smaller end of the socket B, to receive a check-nut D, by means of which the tapered end of the crank is drawn home in the socket. A washer E, interposed between the part A' of the axle and the nut D, is provided with a finger E', extending inwardly for engagement with the toothed periphery F, of the ball-bearing-cone F', which is screwed upon the shaft A, and adjustable thereupon, as will be hereinafter described. The opposite end of the shaft is provided with a transverse, tapering groove G, formed in its face, and designed to receive a tapering pin H, which secures a hub I, firmly to the said end of the shaft. The inner end of the said hub is counter-bored as at I', to adapt it to fit over the said end of the shaft, and constructed with a tapering pin-hole $I^2$, to receive the pin H, before mentioned. The outer end of the said hub is constructed with a tapering hole or socket J, extending at a right angle to the pin-hole $I^2$, and corresponding in its dimensions to the socket B, formed in the enlargement A', at the other end of the axle. This socket J, receive the tapered inner end of a combined crank and pedal pin, not shown herein, but corresponding to the crank C, and pedal pin C', shown at the other end of the shaft, and already described. At its extreme inner end the said hub is provided with a flange K, the edge of which is inwardly offset, and perforated to receive bolts L, by means of which a sprocket-wheel-crown M, is removably secured to the said flange. By means of this construction, the sprocket-wheel-crown may be removed and replaced at pleasure, after the pedal has been taken off without interfering with the crank or its ball bearing. This is an important advantage secured by my invention, as it is a great convenience to be enabled to remove the sprocket-wheel, as for instance, to change it for another of different size, without interfering with the crank-shaft, and the adjustment of the ball-bearings thereof. The hanger N, is an ordinary tubular hanger, clasped at its respective ends by forgings O O, which receive the horizontal members of the lower rear fork of the machine. Encircling the middle hanger is the forging P, the heavy studs Q and R, of which receive the upright and diagonal members of the frame. The said forging P is also constructed with two corresponding arms S S, between which the brake is pivoted. I do not, of course limit myself to providing the hangers with forgings constructed as shown and described, and only show them for better illustration. Two ball-bearing collars T T, are respectively inserted into and abut against the opposite ends of the hanger N, the main-portions of the said collars being larger than the hanger in diameter, and grooved to form race-ways for the two series of balls U, in which they co-operate with ball-bearing cones F' and F², the former being adjustable, as before described, and the latter being fixed on the crank-shaft. The outer end of each collar is rabbeted to receive an annular dust-guard V, which is interposed between the inner edges of the collars and the outer edges of the cones. The inner ends of the collars are made in the form of long sleeves T' T'', which are driven into the hanger, so as to secure the collars in place. If desired, I may provide against the possible turning of the tapered inner ends of the cranks in their sockets, by pins. Such a pin W, mounted in the enlargement A' of the shaft, and extending into the tapered end of the crank, is shown at the left hand in the drawings.

In view of the foregoing suggestions of changes and others which may be made obvious, I would have it understood that I do not limit myself to the exact construction herein shown and described, but hold myself at liberty to make such changes and alterations as fairly fall within the spirit and scope of my invention.

Having fully described my invention, what I claim as new, and desire to secure by Letters Patent, is—

1. In a cycle, the combination with a crank-shaft having one of its ends transversely enlarged, and constructed with a tapering hole or socket intersecting its axial center at a right angle; of a crank having its inner end tapered to fit into the said hole, and threaded at its inner extremity, which projects through the same; and a nut screwed upon said inner end of the crank, and impinging upon the said enlargement of the axle, substantially as described.

2. In a cycle, the combination with a crank-shaft having one of its ends transversely enlarged, and constructed with a tapering hole or socket intersecting its axial center at a right angle; of a crank having its inner end tapered to fit into the said hole, and threaded at its inner extremity, which projects through the same; a nut screwed upon said inner end of the crank, and impinging upon the said enlargement of the axle, and a washer interposed between the nut and the enlargement of the axle, and constructed with an inwardly extending finger for engagement with the adjustable member of a ball-bearing, substantially as described.

3. In a cycle, the combination with a crank-shaft having one of its ends transversely enlarged, and constructed with a tapered hole intersecting its axial center at a right angle, of a combined crank and pedal pin made from a steel rod, bent into shape, and having its inner end tapered to fit into the said hole, and threaded at its extremity, which projects through the same to receive a nut, substantially as described.

4. In a cycle, the combination with a crank-shaft, of a flanged hub counter-bored to fit over one end of the axle to which it is rigidly secured, and constructed at its outer end with a transverse tapering hole or socket; a crank having its inner end adapted to be inserted into the said hole in which it is secured, and a sprocket-wheel crown fastened to the flange of the said hub, substantially as described, and whereby the said crown may be removed and replaced without disturbing the crank or its ball-bearings.

5. In a cycle, the combination with a crank-shaft transversely grooved at one end, of a flanged hub, counter-bored to fit over the said end of the axle, and constructed with two transverse holes, of a pin entered into the inner of the said holes, and into the groove in the axle, whereby the hub is fastened thereto, a crank having its inner end adapted to be entered into the outer of the two holes of the hub, whereby it is secured thereto, and a sprocket-wheel-crown removably attached to the hub flange, substantially as described, and whereby the said crown may be removed and replaced without disturbing the crank, or its ball-bearings.

6. In a cycle, the combination with a crank-shaft transversely enlarged at one end, and constructed with a tapered hole, of a crank adapted to fit into the said hole and to be secured therein; a flanged hub, counter-bored to fit over the opposite end of the axle, and having a transverse hole in its outer end, a crank adapted to fit into the said hole in the hub, and a sprocket-wheel crown removably attached to the flange of the hub, substantially as described.

In testimony whereof I have signed this specification in the presence of two subscribing witnesses.

CHARLES E. HADLEY.

Witnesses:
EUGENE F. RUSSELL,
J. F. BEMIES.